United States Patent
Suparman et al.

(10) Patent No.: US 9,822,629 B2
(45) Date of Patent: Nov. 21, 2017

(54) BEHIND PIPE EVALUATION OF CUT AND PULL TENSION PREDICTION IN WELL ABANDONMENT AND INTERVENTION OPERATIONS

(71) Applicant: Halliburton Energy Services, Inc., Houston, TX (US)

(72) Inventors: Fnu Suparman, Katy, TX (US); Philip Edmund Fox, Covington, LA (US); Gary James Frisch, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 109 days.

(21) Appl. No.: 14/895,039

(22) PCT Filed: Aug. 10, 2015

(86) PCT No.: PCT/US2015/044508
§ 371 (c)(1),
(2) Date: Dec. 1, 2015

(87) PCT Pub. No.: WO2016/028537
PCT Pub. Date: Feb. 25, 2016

(65) Prior Publication Data
US 2016/0194947 A1 Jul. 7, 2016

Related U.S. Application Data

(60) Provisional application No. 62/039,246, filed on Aug. 19, 2014.

(51) Int. Cl.
*E21B 29/00* (2006.01)
*E21B 47/00* (2012.01)
(Continued)

(52) U.S. Cl.
CPC .............. *E21B 47/00* (2013.01); *E21B 29/00* (2013.01); *E21B 33/12* (2013.01); *G05B 19/02* (2013.01); *G06F 9/455* (2013.01)

(58) Field of Classification Search
CPC ........ E21B 29/005; E21B 31/16; E21B 23/00; E21B 29/00; E21B 31/20
See application file for complete search history.

(56) References Cited

U.S. PATENT DOCUMENTS 2,261,564 A * 11/1941 Robichaux .............. E21B 29/00
166/298
4,165,198 A * 8/1979 Farmer ................... E02D 5/385
405/222

(Continued)

FOREIGN PATENT DOCUMENTS

WO 2016028537 A1 2/2016

OTHER PUBLICATIONS

International Search Report and Written Opinion for PCT/US2015/044508 dated Oct. 21, 2015.

*Primary Examiner* — Kipp Wallace
(74) *Attorney, Agent, or Firm* — McDermott Will & Emery LLP

(57) ABSTRACT

Casing removal operations may utilize an analytical model to the estimate the total force to (1) break bonding between a cut casing and the annular materials contained between the cut casing and the surrounding borehole and (2) pull the cut casing upward through the borehole while taking into account frictional forces inside and outside the cut casing, shear forces, and the like. Such models may further predict the casing overpull and total tension needed to extract the cut casing from the borehole. Using these models in conjunction with the specifications of the casing retrieval equipment may (Continued)

allow for determining the cutting depth for producing the cut casing with higher accuracy than previously available.

19 Claims, 6 Drawing Sheets

(51) Int. Cl.
*G05B 19/02* (2006.01)
*G06F 9/455* (2006.01)
*E21B 33/12* (2006.01)

(56) References Cited

U.S. PATENT DOCUMENTS

| | | |
|---|---|---|
| 4,538,684 A | 9/1985 | Sheffield |
| 2002/0060076 A1 | 5/2002 | Harrell |
| 2008/0156494 A1* | 7/2008 | Abadie ................ E21B 29/005 166/298 |
| 2009/0266544 A1 | 10/2009 | Redlinger et al. |
| 2011/0048701 A1 | 3/2011 | Williams et al. |
| 2012/0242342 A1 | 9/2012 | Rabinovich et al. |

* cited by examiner

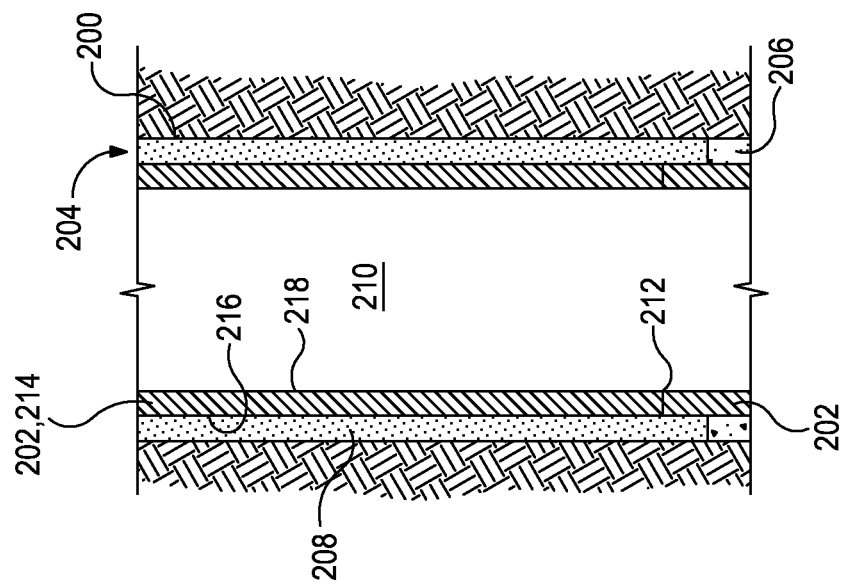
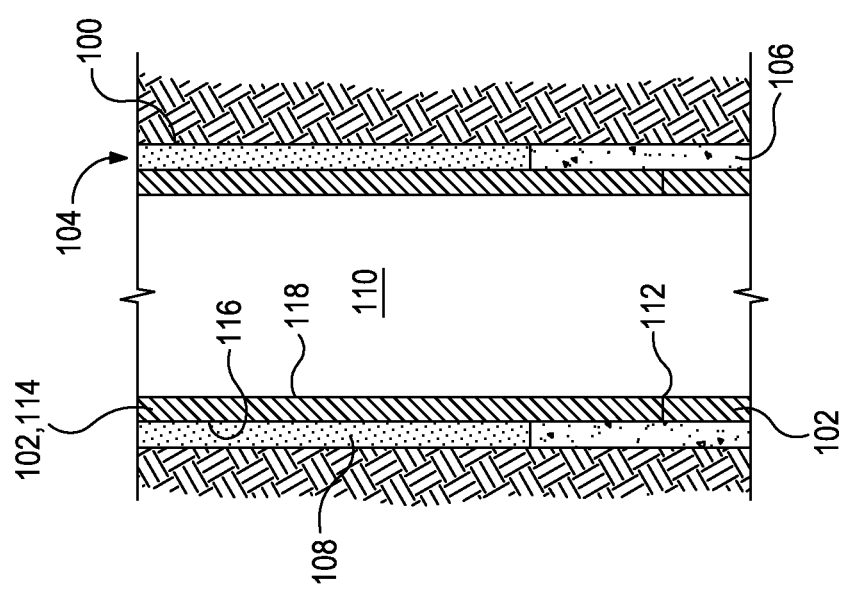

BEHIND PIPE EVALUATION OF CUT AND PULL TENSION PREDICTION IN WELL ABANDONMENT AND INTERVENTION OPERATIONS

BACKGROUND

The exemplary embodiments described herein relate to casing removal operations.

The plug and abandonment (PA) of wells in offshore operations have two very important aspects addressed in the present disclosure. The critical issues associated with PA activities in offshore areas, especially in deep water, are safety and ecological environment protection. PA operations require cost and technologically effective methods. Determination of cutting depths and prediction or estimation of the forces required to pull and remove a portion of the casing lining a wellbore after cutting is becoming a very important set of information. The existing standard method to define free casing (also referred to herein as "pipe"), or pipe that is not bonded, is typically performed using a cement bond log (CBL) and often in conjunction with an ultrasonic device.

The evaluation of casing bond integrity is typically looked at for distinction between free pipe versus the extent of bonding of the pipe to determine a target cutting depth. The previous methods qualitatively define the least amount of force to pull the portion of the casing with minimized risk of having some stuck point above cutting depth. The determination of the depth to cut and pull a casing sometimes involves a trial and error process, which often leads to increased costs and time required to complete the project. The industry needs more accurate and predictable methods to determine optimal cutting depths.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 illustrates a casing disposed in a wellbore.

FIG. 2 illustrates a casing disposed in a wellbore where a cut line of the casing is located above a cement sheath.

DETAILED DESCRIPTION

Figure 3:
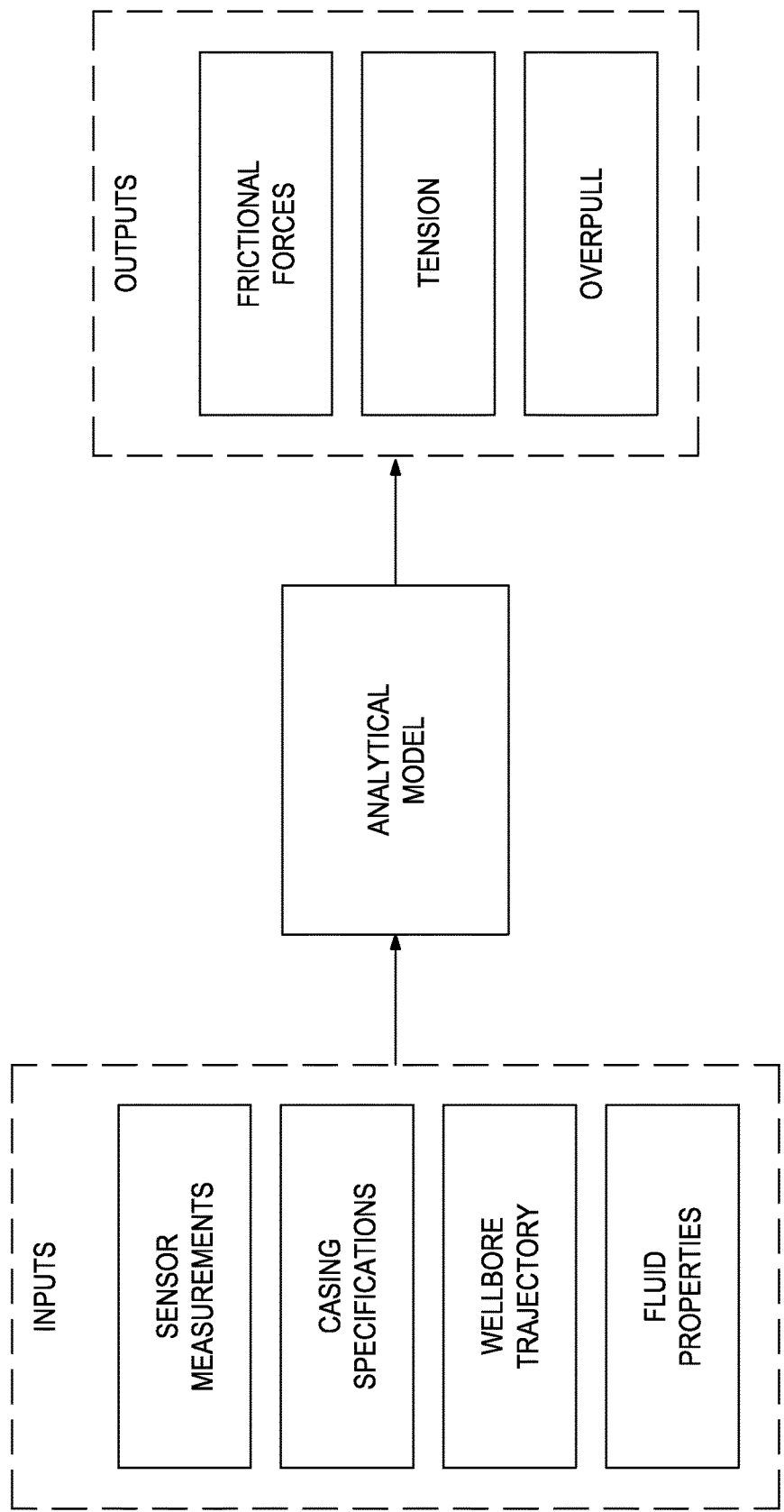
FIG. 3 is a schematic process by which the analytical methods described herein may be executed.

The exemplary embodiments described herein relate to casing removal operations and, more specifically, to analytical models that estimate the total force to (1) break bonding between a cut casing and the annular materials contained between the cut casing and the surrounding borehole and (2) pull the cut casing upward through the borehole. As used herein, the term "cut casing" refers to the portion of the casing from the cutting depth to the top of the casing (i.e., the uphole end of the casing). As used herein, the term "annular materials" refers to materials (e.g., solids, liquids, gases, and combinations thereof) disposed in an annular space and does not imply a specific shape or configuration of the materials.

The analytical model of the present application uses measurements from (1) nuclear sensors, (2) a cement bond log (CBL) tool, (3) ultrasonic devices, or (4) a combination thereof to evaluate and determine characteristics of annular materials disposed in the annulus defined between casing and a wellbore wall. The measurements from these sensors and tools may provide information about the composition of the annular materials and the bonding characteristics of the annular materials and the casing outer wall. Exemplary annular materials may include, but are not limited to, solid cement, settled drilling fluid solids, mud, water, hydrates, light fluid, gas, and combinations thereof.

Each annular material contributes to the frictional forces experienced by the casing outer wall during removal of the cut casing from the borehole. By using the bonding information from CBL and/or ultrasonic measurements and the type of materials in the annulus as determined using the nuclear sensors, the shear strength of the annulus contents may be quantitatively determined, which allows for predicting the casing overpull (i.e., amount of force needed to pull the cut casing upward and out of the borehole) and total tension needed to extract the cut casing from the borehole. The casing overpull and total tension for extraction of the cut casing may be used to determine, with higher accuracy than previously available, a cutting depth for producing the portion of the casing to be extracted.

Implementation of the analytical model described herein may be particularly useful for offshore casing removal operations and for preparing side tracking wells. Additionally, the analytical model and methods described herein may be applied to onshore shale formations for detecting shallow gas leaks to surface or fluid movement to shallow reservoirs including surface water layers. Further, the analytical model and methods described herein may be useful for identifying gas bubbling/flowing behind the casing, which is useful in preventing or mitigating environmental issues.

In some embodiments, the annular materials between the casing and the borehole may be analyzed with one or more of: a CBL tool, an ultrasonic device (e.g., a circumferential acoustic scanning tool), or a nuclear sensor (e.g., a neutron density sensor, a gamma-density sensor, a thermal neutron sensor, a dual-space neutron tool, a pulsed neutron sensor, or any combination thereof). For example, one or more CBL tools may be used for the methods and analyses described herein. In another example, one or more CBL tools in combination with one or more nuclear sensors may be used for the methods and analyses described herein. In yet another example, one or more ultrasonic devices in combination with one or more nuclear sensors may be used for the methods and analyses described herein. In another example, one or more nuclear sensors may be used for the methods and analyses described herein.

The measurements may be performed by any suitable technique including wireline logging. In some instances where more than one measurement is performed, the CBL tool, ultrasonic device, and nuclear sensor may be on the same downhole tool or string of downhole tools. In alternate embodiments, the foregoing sensors and tools may be included on separate downhole tools, where the measurements are performed during different trips through the borehole.

The measurements described herein in addition to the casing specifications, the fluid properties, and a borehole trajectory survey may be input into an analytical model of the present disclosure to yield a suggested cutting depth (i.e., a depth or location in a wellbore to cut the casing so as to produce the cut casing for extraction). Then, in some instances, the casing may be cut in a location based on the suggested cutting depth, and the cut casing produced may be extracted and retrieved from the borehole.

FIG. 1 illustrates a casing 102 disposed in a wellbore 100. The casing 102 and wellbore 100 create an annulus 104 with annular materials disposed therein. As illustrated, a portion of the annulus 104 may include solid cement 106 and another portion of the annulus 104 may be filled with an outer fluid 108 (e.g., settled drilling fluid solids, mud, water, hydrates, light fluid, gas, or combinations thereof). Further, the casing 102 contains an inner fluid 110. For clarity, the adjectives "outer" and "inner" refer to exterior and interior locations, respectively, with respect to a casing. FIG. 1 further illustrates a cut line 112 at a specified cutting depth such that a cut casing 114 is in contact with the solid cement 106, the outer fluid 108, and the inner fluid 110.

FIG. 2 illustrates a casing 202 disposed in a wellbore 200 where a cut line 212 of the casing 202 is located above a cement sheath 206. Accordingly, a cut casing 214 in FIG. 2 is in contact with only an inner fluid 210 in the casing 202 and an outer fluid 208 (e.g., settled drilling fluid solids, mud, water, hydrates, light fluid, gas, or combinations thereof) in an annulus 204 formed by the wellbore 200 and the casing 202.

The analytical model of the present disclosure estimates the total frictional force ($F_{tot}$) for extracting the cut casing from the wellbore for the two scenarios illustrated in FIGS. 1 and 2. First, (1) nuclear sensors, (2) a CBL tool, (3) ultrasonic devices, or (4) a combination thereof evaluate the location and composition of annular materials. Then, the $F_{tot}$ may be calculated for a one or more cutting depths for the two scenarios: (1) an as-logged annulus where the composition and location of the annular materials from the foregoing analyses and the cutting depth is at a location along the solid cement as illustrated in FIG. 1 ($F_{tot,as\ log}$) and (2) a liquid-filled annulus at the same cutting depth but assuming that all annular materials down to the cutting depth are outer fluids as illustrated in FIG. 2 ($F_{tot,liq}$). Therefore, the two scenarios calculate the $F_{tot}$ for the two extremes where the $F_{tot,as\ log}$ is the greatest expected force to extract the cut casing from the wellbore and the $F_{tot,liq}$ is the least expected force, which may each calculated according to Equations 1 and 2, respectively.

$$F_{tot,as\ log} = EW_{cs} + FF_{in,as\ log} + FF_{out,as\ log} + FS_{out,as\ log} + F_{shear} \quad \text{Equation 1}$$

where:
- $EW_{cs}$ is the total effective casing weight (Equation 3);
- $FF_{in,as\ log}$ is a total fluid frictional force between a fluid contained within the cut casing 114 (i.e., the inner fluid 110) and an inner surface 116 of the cut casing 114 in the as-logged annulus 104 for a total length of the cut casing 114;
- $FF_{out,as\ log}$ is a total fluid frictional force between a fluid contained within the annulus 104 (i.e., the outer fluid 108) and an outer surface 118 of the cut casing 114 in the as-logged annulus 104 for the total length of the cut casing 114;
- $FS_{out,as\ log}$ is a total solid frictional force between solids contained within the annulus 104 (e.g., settled drilling fluid solids, the cement sheath 106, and the like) and the outer surface 118 of the cut casing 114 in the as-logged annulus for the total length of the cut casing 114;
- $F_{shear}$ is a total shear force to break the bond between the cement sheath 106 in the annulus 104 and the cut casing 114 in the as-logged annulus 104;

$$F_{tot,liq} = EW_{cs} + FF_{in,liq} + FF_{out,liq} \quad \text{Equation 2}$$

where:
- $FF_{in,liq}$ is a total fluid frictional force between a fluid contained within the cut casing 214 (i.e., the inner fluid 210) and the inner surface 216 of the cut casing 214 in the liquid-filled annulus for the total length of the cut casing 214; and
- $FF_{out,liq}$ is a total fluid frictional force between a fluid contained within the annulus 204 (i.e., the outer fluid 208) and the outer surface 218 of the cut casing 214 in the liquid-filled annulus for the total length of the cut casing 214;

$$EW_{cs} = GW_{cs} * BF \quad \text{Equation 3}$$

where:
- $GW_{cs}$ is gross weight of the cut casing; and
- BF is the is the buoyance factor of the cut casing Some embodiments may involve modeling the liquid-filled annulus based on the as-logged annulus without solids therein. Further, some embodiments may involve modeling a plurality of cut casings at different cutting depths and calculating $F_{tot,as\ log}$ and $F_{tot,liq}$ for each of the modeled cut casing. Described further below, the $F_{tot,as\ log}$ and $F_{tot,liq}$ for each of the modeled cut casing along with specifications of the casing retrieval equipment may be used to determine a preferred cutting depth.

Referring again to the foregoing equations, Equation 2 for $F_{tot,liq}$ does not include $FS_{OUT}$ or $F_{shear}$ terms because in the liquid-filled annulus model, solids are not present along the cut casing 214.

The difference between $F_{tot,as\ log}$ and $F_{tot,liq}$ is the total drag force ($F_{drag}$) for extracting the cut casing from the wellbore and is given in Equation 4. Because the frictional forces from the inner fluids 110,210 are the same (i.e., $F_{in,as\ log} = FF_{in,liq}$), the terms $FF_{in,as\ log}$ and $FF_{in,liq}$ and each of the $EW_{cs}$ are not present in the expanded portion of Equation 4.

$$F_{drag} = F_{tot,as\ log} - F_{tot,liq} = FF_{out,as\ log} + FS_{out,as\ log} + F_{shear} - FF_{out,liq} \quad \text{Equation 4}$$

Each of $FF_{in,as\ out}$, $FF_{in,liq}$, $FF_{out,as\ log}$, $FS_{out,as\ log}$, $F_{shear}$, and $FF_{out,liq}$ may be calculated according to Equations 5-9.

$$FF_{in,as\ log} = FF_{in,liq} = \Sigma \alpha_{fl,i} * (\rho_i * g * z) * (\pi * d_i * \Delta z) \quad \text{Equation 5}$$

where:
- $\alpha_{fl,i}$ is the friction coefficient of the inner fluid;
- $\rho_i$ is the density of the inner fluid;
- g is the acceleration of gravity;
- z is the depth of the cut line;
- $d_i$ is the inner diameter of the cut casing; and
- $\Delta z$ is the length of the cut casing $$FF_{out,as\ log} = \Sigma \alpha_{fl,o} * (\rho_o * g * z) * (1 - S_{cv}) * (\pi * d_o * \Delta z) \quad \text{Equation 6}$$

where:
- $\alpha_{fl,o}$ is the friction coefficient of the outer fluid;
- $\rho_o$ is the density of the outer fluid;
- $d_o$ is the outer diameter of the cut casing; and $S_{cv}$ is the fraction $\Delta z$ of the cut casing contacting the outer solid (i.e., the solid in the annulus)

$$FS_{out,as\ log}=\Sigma\alpha_{sol}*(\rho_o*g*z)*(S_{cv})*(\pi*d_o*\Delta z) \quad \text{Equation 7}$$

where:
$\alpha_{sol}$ is the friction coefficient of the outer solid $$F_{shear}=\Sigma_i{}^{SI}\alpha_{sh}*S_{cv}*SI*\Delta z \quad \text{Equation 8}$$

where:
$\alpha_{sh}$ is the shear coefficient for the annular material; and
SI is the shear index as a function of impedance, bulk density of the annular material, and the thickness of the annular material $$FF_{out,liq}=\Sigma\alpha_{fl,o}*(\rho_o*g*z)*(\pi*d_o*\Delta z) \quad \text{Equation 9}$$

Some embodiments may involve modeling the liquid-filled annulus based on the as-logged annulus without solids therein. Further, some embodiments may involve modeling a plurality of cut casings at different cutting depths and calculating $F_{drag}$ based on the as-logged annulus and the liquid-filled annulus for each of the modeled cut casing. Described further below, $F_{drag}$ for each of the modeled cut casing along with specifications of the casing retrieval equipment may be used to determine a preferred cutting depth.

In the conditions where wells are constructed with multiple casings concentrically-arranged within one another, the above equations and analytical models described herein may be updated to account for the contents of a second annulus defined between concentric casings and, if applicable, any deeper annular regions.

The foregoing description of the analytical models disclosed herein are for vertical portions of a wellbore, but may be adapted for deviated wellbore. To do so, the friction force for deviated portions of the wellbore may be projected in two components: (1) the horizontal component and (2) the vertical component. The total friction force will be the resultant of those two components.

FIG. 3 illustrates a process by which the analytical methods described herein may be executed. Inputs may include the casing specifications (e.g., $d_i$, z, $\Delta z$, and $d_o$), the fluid properties (e.g., $\rho_o$ and $\rho_l$), the well trajectory survey, and the sensor measurements (e.g., the $S_{cv}$ may be measured by the ultrasonic device). Regarding the various frictional coefficients, each may be estimated based on the compositions to which the particular frictional coefficient relates. Further, in some instances, data from previous cut and pull operations may be used to update the various frictional coefficients using error minimization for a best fit curve character.

The analytical model may produce one or more outputs. In some instances, the analytical model may output one or more of the frictional forces described above ($F_{drag}$, $F_{tot,as\ log}$, or $F_{tot,liq}$). In some instances, the analytical model may use the frictional forces to derive the tension and/or overpull associated with the cut and pull operation. Tension and overpull may be calculated by a variety of known methods that take into account the frictional forces ($F_{drag}$, $F_{tot,as\ log}$, or $F_{tot,liq}$).

Figure 5:
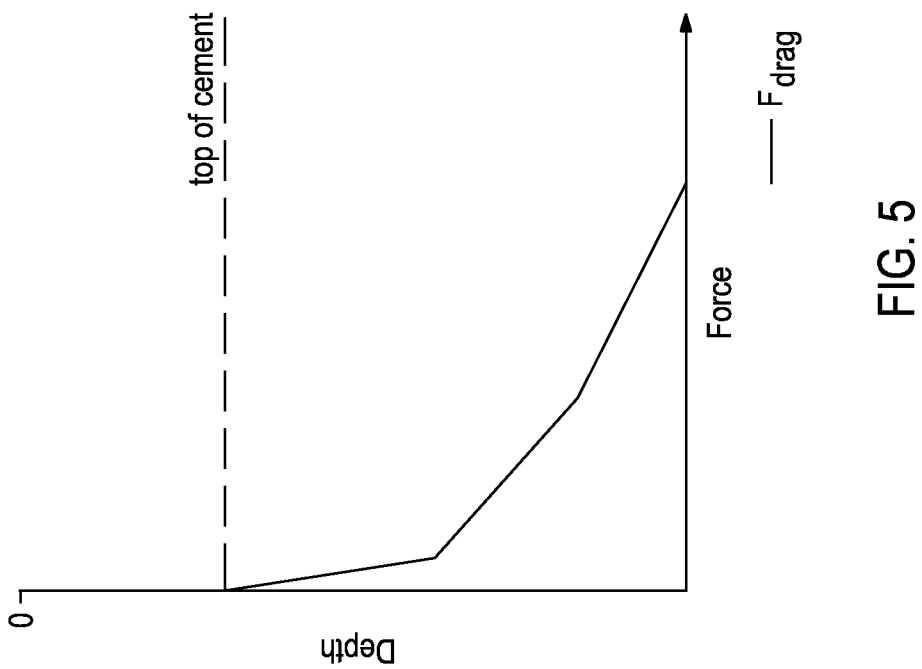
FIG. 5 illustrates an exemplary plot of $F_{drag}$ as a function of wellbore depth.
Figure 4:
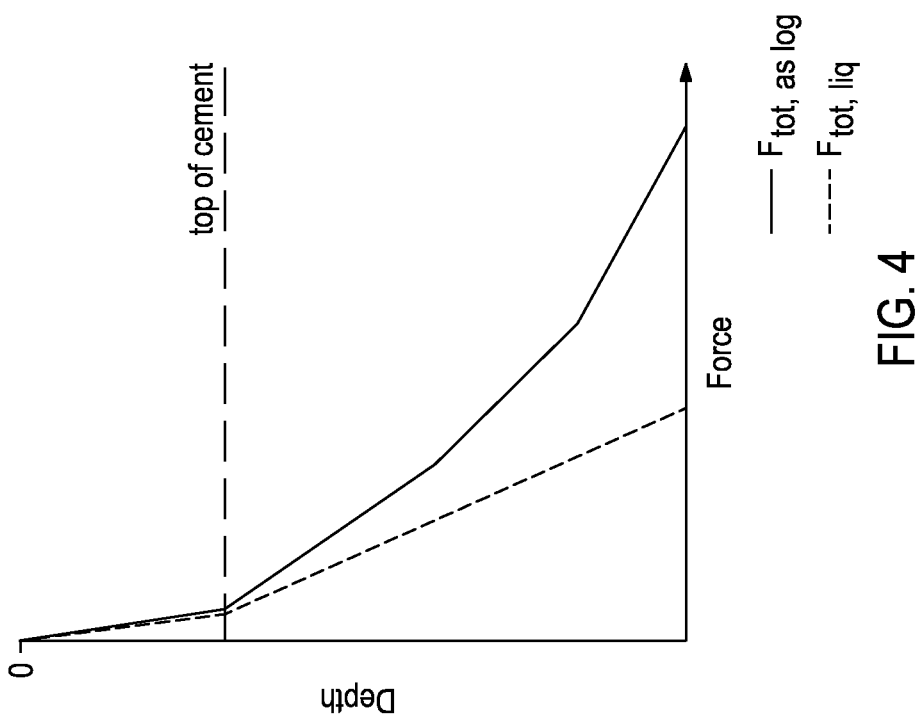
FIG. 4 illustrates an exemplary plot of $F_{tot,as\ log}$ and $F_{tot,liq}$ as a function of wellbore depth.

In some embodiments, the methods described herein may execute the analytical model using a variety of cutting depths. Then, the output may be the calculated frictional forces, tension, and/or overpull as a function of depth. For example, FIG. 4 illustrates an exemplary plot of $F_{tot,as\ log}$ and $F_{tot,liq}$ as a function of wellbore depth. As illustrated, the two frictional forces are essentially equal until reaching the top of the cement (horizontal dotted like), then the $F_{tot,as\ log}$ increases at a greater rate than the $F_{tot,liq}$ because the all-liquid scenario has less frictional force with no solid frictional or shear components. FIG. 5 illustrates the corresponding $F_{drag}$, which as described above, is the difference between the $F_{tot,as\ log}$ and $F_{tot,liq}$. Similarly, the method may involve plotting tension and/or overpull as a function of depth for one or more of the frictional forces.

In cut and pull operations, it is typically desired to cut at the deepest depth possible taking into consideration the specifications for the casing retrieval equipment (e.g., the hoisting apparatus, conveyance, platform, and the like) and safety (e.g., operating at no more than 10% less of the maximum casing retrieval equipment specifications). In some instances, a threshold value for the frictional force (P thresh) based on the rig capacity for maximum pull within safety limits, the tension, and/or the overpull may be determined based on the safety considerations and the casing retrieval equipment specifications. The cutting depth may then be determined such that $F_{tot,as\ log}<F_{thresh}$ and/or $F_{drag}+F_{tot,liq}<F_{thresh}$. Similarly, the cutting depth may be determined such that the threshold tension and/or overpull is between a minimum tension and/or overpull is based on the $F_{tot,liq}$ and a maximum tension and/or overpull is based on the $F_{tot,as\ log}$. That is, in some embodiments, determining the preferred cutting depth may involve calculating a tension for the as-logged annulus ($T_{tot,as\ log}$) using $F_{tot,as\ log}$, a tension for the liquid-filled annulus ($T_{tot,liq}$) using $F_{tot,liq}$, a tension for the drag force using $F_{drag}$, and/or a threshold tension ($T_{thresh}$) based on the specifications of casing retrieval equipment, wherein the preferred cutting depth provides for $T_{tot,as\ log}<T_{thresh}$ and/or $T_{drag}+T_{tot,liq}<T_{thresh}$. In some instances, determining the preferred cutting depth may involve calculating an overpull for the as-logged annulus ($OP_{tot,as\ log}$) using $F_{tot,as\ log}$, an overpull for the liquid-filled annulus ($OP_{tot,liq}$) using $F_{tot,liq}$, an overpull for the drag force ($OP_{drag}$) using $F_{drag}$, and/or a threshold overpull ($OP_{thresh}$) thresh) based on the specifications of casing retrieval equipment, wherein the preferred cutting depth provides for $OP_{tot,as\ log}<OP_{thresh}$ and/or $OP_{drag}+OP_{tot,liq}<OP_{thresh}$.

In some embodiments, the mud may be circulated within the wellbore after cutting and before pulling the casing. This may decrease the total tension required for pulling the casing because some of the solid may be lifted to the surface during the mud circulation.

Figure 6:
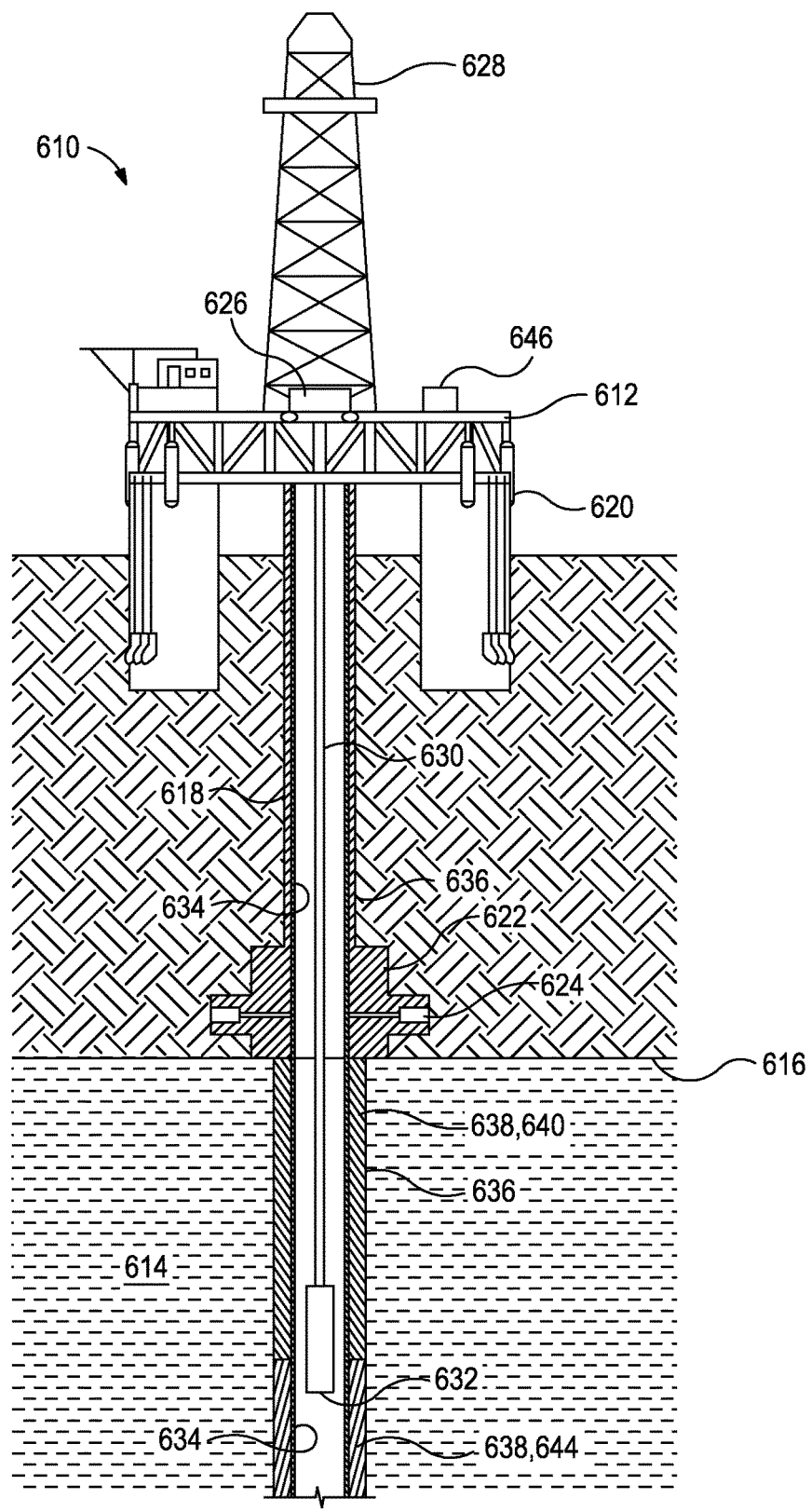
FIG. 6 illustrates an exemplary system suitable for performing the analyses and methods of the present application.

FIG. 6 provides an exemplary illustration of a system 610 suitable for performing the analyses and methods described herein, according to at least some embodiments. While this example is illustrated as an offshore system 610, those skilled in the art will recognize the applicability and corresponding modification for onshore systems, without departing from the scope of the disclosure.

As illustrated, a semi-submersible platform 612 is centered over a submerged oil and gas formation 614 located below sea floor 616. A subsea conduit 618 extends from a deck 620 of the platform 612 to a wellhead installation 622 including subsea blow-out preventers 624. The platform 612 has a hoisting apparatus 626 and a derrick 628 for conveying a tool 632 coupled to a conveyance 630 through a wellbore 636 penetrating the subterranean formation 614. Although depicted as a wireline, conveyance 630 may be, but is not limited to, a wireline, a coiled tubing, a slickline, a cable, a downhole tractor, and the like.

Annular materials 638 are disposed between the casing 634 and the wellbore 636. As illustrated, the annular materials 638 transition from a liquid 640 to cement 644 at a point along the wellbore 636. The tool 632 may be used to measure a property of the annular materials 638 along a length or portion of the wellbore 636. The measurements may be conveyed to a control system 648 and used as inputs for the analytical model described herein for determining a cutting line. Then, the casing 634 may be cut at or near the cutting line and pulled to the platform 612 (or the surface for a land-based system).

The control system(s) 648 and corresponding computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments described herein may include Embodiments A, B, C, or D.

Embodiment A is a method that includes measuring at least one characteristic of fluids and solids disposed in an annulus defined between a casing and a wellbore with at least one of: a cement bond log tool, an ultrasonic device, or a neutron sensor, and thereby providing an as-logged annulus; modeling a liquid-filled annulus based on the as-logged annulus without solids therein; modeling a plurality of cut casings at different cutting depths; calculating a total force for the as-logged annulus ($F_{tot,as\ log}$) for extracting each of the plurality of cut casings; calculating a total force for the liquid-filled annulus ($F_{tot,liq}$) for extracting each of the plurality of cut casings; and determining a preferred cutting depth based on the $F_{tot,as\ log}$ for each of the plurality of cut casings, the $F_{tot,liq}$ for each of the plurality of cut casings, and specifications of casing retrieval equipment.

Embodiment B is system that includes a conveyance extendable into a wellbore lined at least partially with a casing, wherein the conveyance is coupled to at least one of: a cement bond log tool, an ultrasonic device, or a neutron sensor, and wherein fluids and solids are contained in an annulus defined between the casing and the wellbore; and a control system that includes a non-transitory medium readable by a processor and storing instructions that when executed by the processor cause the control system to: measure at least one characteristic of the fluids and solids the at least one of: the cement bond log tool, the ultrasonic device, or the neutron sensor, and thereby providing an as-logged annulus; model a liquid-filled annulus based on the as-logged annulus without solids therein; model a plurality of cut casings at different cutting depths; calculate a total force for the as-logged annulus ($F_{tot,as\ log}$) for extracting each of the plurality of cut casings; calculate a total force for the liquid-filled annulus ($F_{tot,liq}$) for extracting each of the plurality of cut casings; and determine a preferred cutting depth based on the $F_{tot,as\ log}$ for each of the plurality of cut casings, the $F_{tot,liq}$ for each of the plurality of cut casings, and specifications of casing retrieval equipment.

Embodiments A and B may further include one or more of the following: Element 1: the method further including performing (or the instruction further causing the control system to perform) a casing removal operation at the preferred cutting depth with the casing retrieval equipment; Element 2: wherein $F_{tot,as\ log}$ is calculated according to Equation 1; Element 3: wherein $F_{tot,liq}$ is calculated according to Equation 2; Element 4: the method further including calculating (or the instruction further causing the control system to calculate) a drag force ($F_{drag}$) according to Equation 4, wherein determining the preferred cutting depth is further based on $F_{drag}$; Element 5: the method further including Element 4 and calculating (or the instruction further causing the control system to perform Element 4 and calculate) a threshold force ($F_{thresh}$) based on the specifications of casing retrieval equipment, and wherein the preferred cutting depth provides for $F_{tot,as\ log} < F_{thresh}$ and/or $F_{drag} + F_{tot,liq} < F_{thresh}$; Element 6: the method further including Element 5 and calculating (or the instruction further causing the control system to perform Element 5 and calculate) a tension for the as-logged annulus ($T_{tot,as\ log}$) using $F_{tot,as\ log}$, a tension for the liquid-filled annulus ($T_{tot,liq}$) using $F_{tot,liq}$, a tension for the drag force ($T_{drag}$) using $F_{drag}$, and a threshold tension ($T_{thresh}$) based on the specifications of casing retrieval equipment, wherein the preferred cutting depth provides for $T_{tot,as\ log} < T_{thresh}$ and/or $T_{drag} + T_{tot,liq} < T_{thresh}$; and Element 7: the method further including Element 5 and calculating (or the instruction further causing the control system to perform Element 5 and calculate) an overpull for the as-logged annulus ($OP_{tot,as\ log}$) using $F_{tot,as\ log}$, an overpull for the liquid-filled annulus ($OP_{tot,liq}$) using $F_{tot,liq}$, an overpull for the drag force ($OP_{drag}$) using $F_{drag}$, and a threshold overpull ($OP_{thresh}$) based on the specifications of casing retrieval equipment, wherein the preferred cutting depth provides for $OP_{tot,as\ log} < OP_{thresh}$ and/or $OP_{drag} + OP_{tot,liq} < OP_{thresh}$. Exemplary combinations of elements may include, but are not limited to, Element 1 in combination with Elements 2 and/or 3 and optionally further in combination with at least one of Elements 4-7;

Elements 2 and 3 in combination and optionally further in combination with at least one of Elements 4-7; Element 1 in combination with at least one of Elements 4-7; and at least two of Elements 4-7 in combination.

Embodiment C is a method that includes measuring at least one characteristic of fluids and solids disposed in an annulus formed by a casing and a wellbore with at least one of: a cement bond log, an ultrasonic device, or a neutron sensor, thereby providing an as-logged annulus; modeling a liquid-filled annulus based on the as-logged annulus without solids therein; modeling a plurality of cut casings at different cutting depths; calculating a drag force ($F_{drag}$) for extracting each of the plurality of cut casings based on the as-logged annulus and the liquid-filled annulus; determining an preferred cutting depth based on the $F_{drag}$ for each of the plurality of cut casings and specifications of casing retrieval equipment.

Embodiment D is a system that includes a conveyance extendable into a wellbore lined at least partially with a casing, wherein the conveyance is coupled to at least one of: a cement bond log tool, an ultrasonic device, or a neutron sensor, and wherein fluids and solids are contained in an annulus defined between the casing and the wellbore; and a control system that includes a non-transitory medium readable by a processor and storing instructions that when executed by the processor cause the control system to: measure at least one characteristic of fluids and solids disposed in an annulus formed by a casing and a wellbore with at least one of: a cement bond log, an ultrasonic device, or a neutron sensor, thereby providing an as-logged annulus; model a liquid-filled annulus based on the as-logged annulus without solids therein; model a plurality of cut casings at different cutting depths; calculate a drag force ($F_{drag}$) for extracting each of the plurality of cut casings based on the as-logged annulus and the liquid-filled annulus; and determine an preferred cutting depth based on the $F_{drag}$ for each of the plurality of cut casings and specifications of casing retrieval equipment.

Embodiments C and D may further include one or more of the following: Element 1; Element 8: wherein $F_{drag}$ is calculated according to Equation 4; Element 9: wherein the method further comprises calculating (or the instruction further causing the control system to calculate) a threshold force (F thresh) based on the specifications of casing retrieval equipment, wherein the preferred cutting depth provides for $F_{drag} < F_{thresh}$; Element 10: wherein the method further comprises calculating (or the instruction further causing the control system to calculate) a tension ($T_{drag}$) using $F_{drag}$ and a threshold tension ($T_{thresh}$) based on the specifications of casing retrieval equipment, wherein the preferred cutting depth provides for $T_{drag} < T_{thresh}$; and Element 11: wherein the method further comprises calculating (or the instruction further causing the control system to calculate) an overpull ($OP_{drag}$) using $F_{drag}$ and a threshold overpull ($OP_{thresh}$) based on the specifications of casing retrieval equipment, and wherein the preferred cutting depth provides for $OP_{drag} < OP_{thresh}$ Exemplary combinations of elements may include, but are not limited to, Element 1 in combination with Element 8 and optionally further in combination with at least one of Elements 9-11; Element 1 in combination with at least one of Elements 9-11; Element 8 in combination with at least one of Elements 9-11; and two or more of 9-11 in combination.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present disclosure, the following examples of preferred or representative embodiments are given. In no way should the following examples be read to limit, or to define, the scope of the invention.

EXAMPLES

Linear Programing from MATLAB® (a high-level language and interactive environment for numerical computation, visualization, and programming, available from Math-Works) was used to solve the modeling logic in order to find the friction coefficients for $FF_{in,as\ log}$, $FF_{in,liq}$, $FF_{out,as\ log}$, $F_{shear}$ and $FF_{out,liq}$ described above in Equations 5-9. The basic equation was written in the form of matrix as Equation 10, where Y is the matrix output, A is the matrix input, and x is the friction coefficient that is to be optimized.

$$Y = A \cdot x \qquad \text{Equation 10}$$

When optimizing $\alpha_{fl,i}$ and $\alpha_{fl,o}$, each of $\alpha_{fl,i}$ and $\alpha_{fl,o}$ were varied as a function of the inner fluid viscosity and the outer fluid viscosity, respectively. Similarly, $\alpha_{sol}$ also can be separated individually for multiple solids due to mud settling in combination with other solid types such as cement. The $\alpha_{sh}$ was likewise individually separated for solid settling and other modeled solid types such as cement. All the friction coefficients were optimized by linear programing using MATLAB® software with actual existing data from the cut and pull operations in a historical history matching manner.

Figure 8:
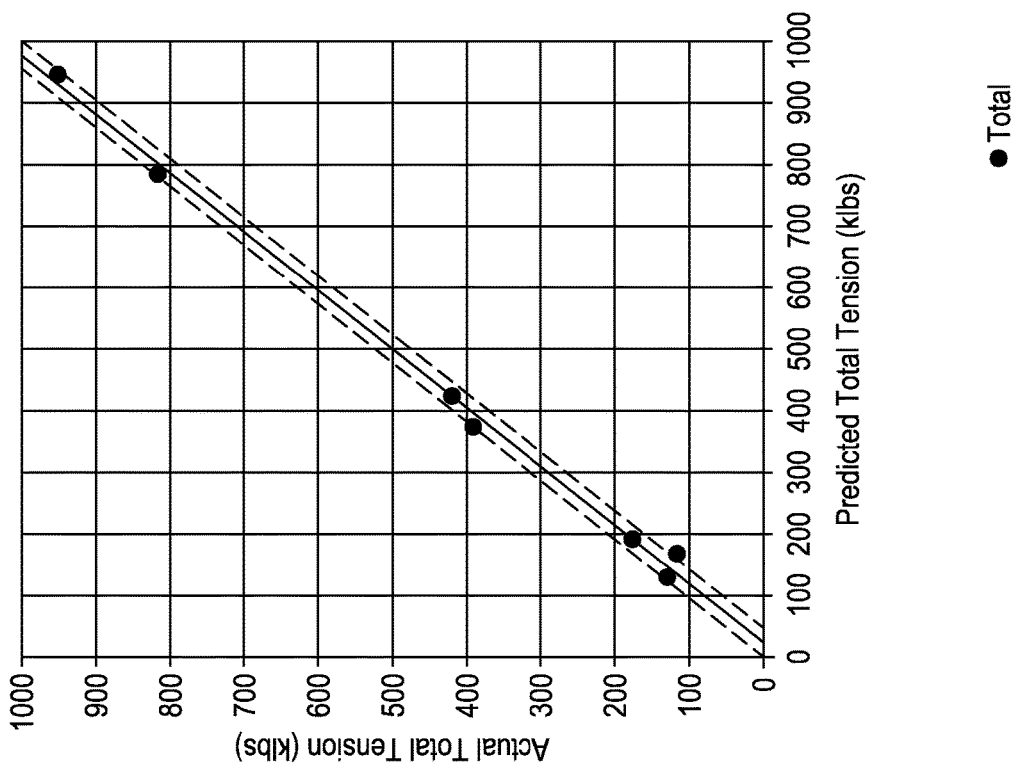
FIGS. 7 and 8 illustrate crossplots of the predicted and actual data for the overpull and tension, respectively.
Figure 7:
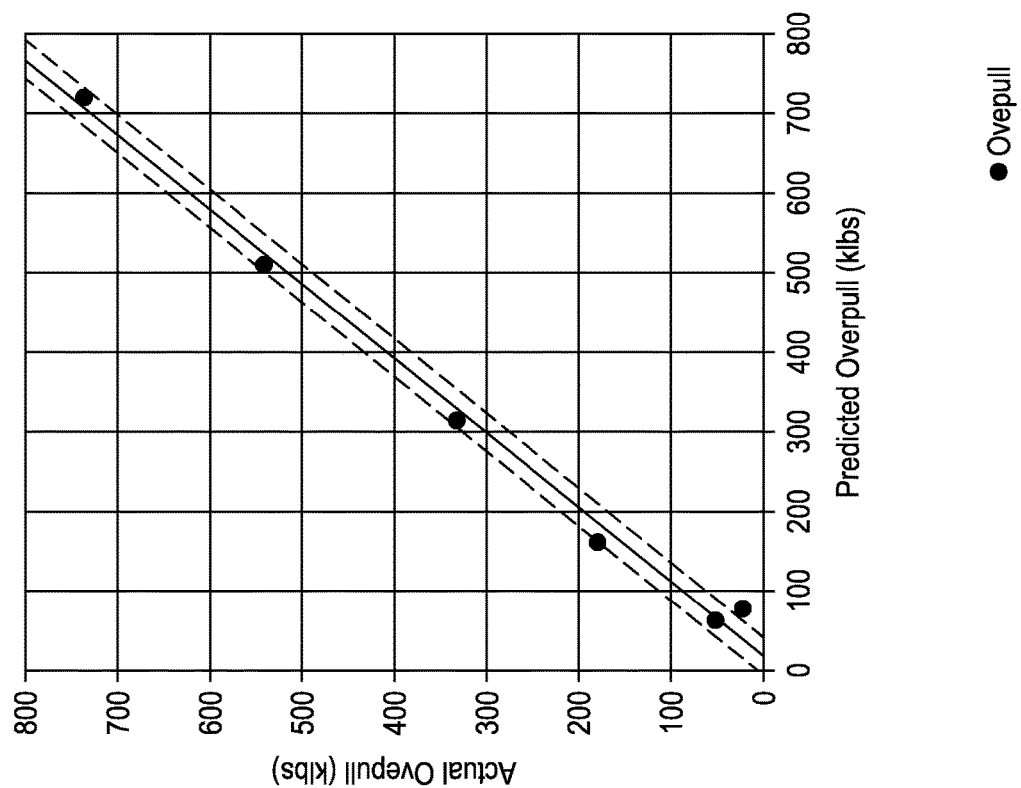

Comparison of actual overpull and total tension applied when cutting and pulling casing for abandonment (7 wells) compared with the prediction calculations from the analytical model with the friction coefficients derived as described above. FIGS. 7 and 8 are crossplots of the predicted and actual data for the overpull and tension, respectively. These crossplots illustrate that the analytical model estimates overpull and total tension values accurately, which is evidenced by the high values for $R^2$.

Figure 10:
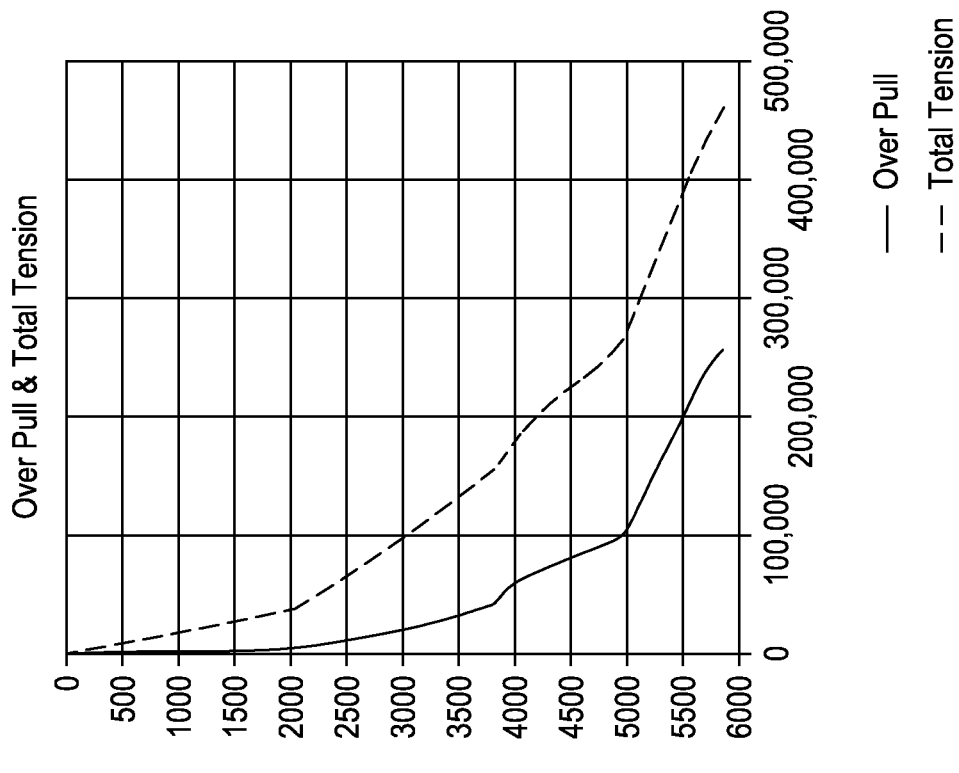
FIGS. 9 and 10 illustrate the calculated overpull and tension as a function of depth using the $F_{tot,liq}$ and the $F_{tot,as\ log}$, respectively.
Figure 9:
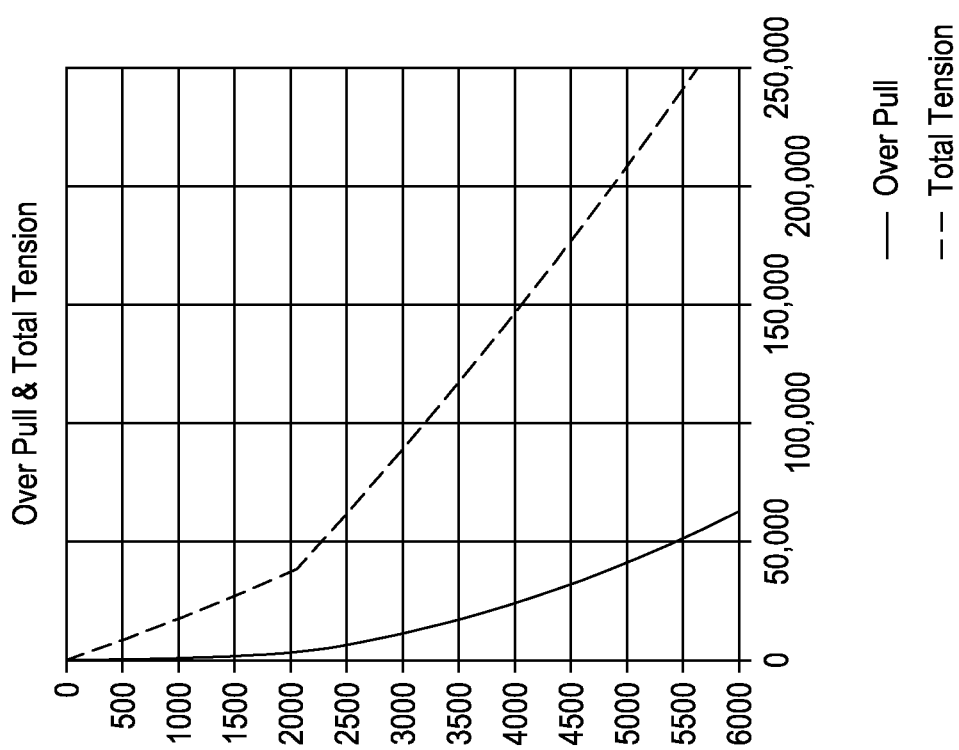

Using the derived frictional coefficients, the overpull and tension was calculated for a liquid-filled annulus and an as-logged annulus. FIGS. 9 and 10 provide the calculated overpull and tension as a function of depth using the $F_{tot,liq}$ (liquid-filled annulus) and the $F_{tot,as\ log}$ (as-logged annulus), respectively. This illustrates the graphical outputs from the analytical model described herein that may be used in determining a cutting depth.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    measuring at least one characteristic of fluids and solids disposed in an annulus defined between a casing and a wellbore with at least one of: a cement bond log tool, an ultrasonic device, or a neutron sensor, and thereby providing an as-logged annulus;
    modeling a liquid-filled annulus based on the as-logged annulus without solids therein;
    modeling a plurality of cut casings at different cutting depths;
    calculating a total force for the as-logged annulus ($F_{tot,as\ log}$) for extracting each of the plurality of cut casings;
    calculating a total force for the liquid-filled annulus ($F_{tot,liq}$) for extracting each of the plurality of cut casings; and
    determining a preferred cutting depth based on the $F_{tot,as\ log}$ for each of the plurality of cut casings, the $F_{tot,liq}$ for each of the plurality of cut casings, and specifications of casing retrieval equipment.

2. The method of claim 1 further comprising:
    performing a casing removal operation at the preferred cutting depth with the casing retrieval equipment.

3. The method of claim 1, wherein $F_{tot,as\ log}$ is calculated according to Equation 1:

$$F_{tot,as\ log} = EW_{cs} FF_{in,as\ log} + FF_{out,as\ log} + FS_{out,as\ log} + F_{shear} \quad \text{Equation 1}$$

where:
   $EW_{cs}$ is a total effective casing weight of the cut casing;
   $FF_{in,as\ log}$ is a total fluid frictional force between a fluid contained within the cut casing and an inner surface of the cut casing in the as-logged annulus for a total length of the cut casing;
   $FF_{out,as\ log}$ is a total fluid frictional force between a fluid contained within the annulus and an outer surface of the cut casing in the as-logged annulus for the total length of the cut casing;
   $FS_{out,as\ log}$ is a total solid frictional force between solids contained within the annulus and the outer surface of the cut casing in the as-logged annulus for the total length of the cut casing;
   $F_{shear}$ is a total shear force to break the bond between a cement sheath in the annulus and the cut casing in the as-logged annulus;
   $FF_{in,liq}$ is a total fluid frictional force between a fluid contained within the cut casing and the inner surface of the cut casing in the liquid-filled annulus for the total length of the cut casing; and
   $FF_{out,liq}$ is a total fluid frictional force between a fluid contained within the annulus and the outer surface of the cut casing in the liquid-filled annulus for the total length of the cut casing.

4. The method of claim 1, wherein $F_{tot,liq}$ is calculated according to Equation 2:

$$F_{tot,liq} = EW_{cs} + FF_{in,liq} + FF_{out,liq} \quad \text{Equation 2}$$

where:
   $EW_{cs}$ is a total effective casing weight of the cut casing;
   $FF_{in,as\ log}$ is a total fluid frictional force between a fluid contained within the cut casing and an inner surface of the cut casing in the as-logged annulus for a total length of the cut casing;
   $FF_{out,as\ log}$ is a total fluid frictional force between a fluid contained within the annulus and an outer surface of the cut casing in the as-logged annulus for the total length of the cut casing;
   $FS_{out,as\ log}$ is a total solid frictional force between solids contained within the annulus and the outer surface of the cut casing in the as-logged annulus for the total length of the cut casing;
   $F_{shear}$ is a total shear force to break the bond between a cement sheath in the annulus and the cut casing in the as-logged annulus;
   $FF_{in,liq}$ is a total fluid frictional force between a fluid contained within the cut casing and the inner surface of the cut casing in the liquid-filled annulus for the total length of the cut casing; and
   $FF_{out,liq}$ is a total fluid frictional force between a fluid contained within the annulus and the outer surface of the cut casing in the liquid-filled annulus for the total length of the cut casing.

5. The method of claim 4 further comprising:
    calculating a drag force ($F_{drag}$) according to Equation 4

$$F_{drag} = F_{tot,as\ log} - F_{tot,liq} = FF_{out,as\ log} + FS_{out,as\ log} + F_{shear} - FF_{out,liq} \quad \text{Equation 4;}$$

wherein determining the preferred cutting depth is further based on $F_{drag}$.

6. The method of claim 5, wherein determining the preferred cutting depth comprises: calculating a threshold force ($F_{thresh}$) based on the specifications of casing retrieval equipment and the preferred cutting depth provides for $F_{tot,as\ log} < F_{thresh}$ and/or $F_{drag} + F_{tot,liq} < F_{thresh}$.

7. The method of claim 6, wherein determining the preferred cutting depth further comprises: calculating a tension for the as-logged annulus ($T_{tot,as\ log}$) using $F_{tot,as\ log}$, a tension for the liquid-filled annulus ($T_{tot,liq}$) using $F_{tot,liq}$, a tension for the drag force ($T_{drag}$) using $F_{drag}$, and a threshold tension ($T_{thresh}$) based on the specifications of casing retrieval equipment, wherein the preferred cutting depth provides for $T_{tot,as\ log} < T_{thresh}$ and/or $T_{drag} + T_{tot,liq} < T_{thresh}$.

8. The method of claim 6, wherein determining the preferred cutting depth further comprises: calculating an overpull for the as-logged annulus ($OP_{tot,as\ log}$) using $F_{tot,as\ log}$, an overpull for the liquid-filled annulus ($OP_{tot,liq}$) using $F_{tot,liq}$, an overpull for the drag force ($OP_{drag}$) using $F_{drag}$, and a threshold overpull ($OP_{thresh}$) based on the specifications of casing retrieval equipment, wherein the preferred cutting depth provides for $OP_{tot,as\ log} < OP_{thresh}$ and/or $OP_{drag} + OP_{tot,liq} < OP_{thresh}$.

9. A method comprising:
measuring at least one characteristic of fluids and solids disposed in an annulus formed by a casing and a wellbore with at least one of: a cement bond log, an ultrasonic device, or a neutron sensor, thereby providing an as-logged annulus;
modeling a liquid-filled annulus based on the as-logged annulus without solids therein;
modeling a plurality of cut casings at different cutting depths;
calculating a drag force ($F_{drag}$) for extracting each of the plurality of cut casings based on the as-logged annulus and the liquid-filled annulus; and
determining a preferred cutting depth based on the $F_{drag}$ for each of the plurality of cut casings and specifications of casing retrieval equipment.

10. The method of claim 9 further comprising:
performing a casing removal operation at the preferred cutting depth with the casing retrieval equipment.

11. The method of claim 9, wherein $F_{drag}$ is calculated according to Equation 4:

$$F_{drag} = FF_{out,as\ log} + FS_{out,as\ log} + F_{shear} - FF_{out,liq} \qquad \text{Equation 4}$$

where:
$FF_{out,as\ log}$ is a total fluid frictional force between a fluid contained within the annulus and an outer surface of the cut casing in the as-logged annulus for the total length of the cut casing;
$FS_{out,as\ log}$ is a total solid frictional force between solids contained within the annulus and an inner surface of the cut casing in the as-logged annulus for the total length of the cut casing;
$F_{shear}$ is a total shear force to break the bond between a cement sheath in the annulus and the cut casing in the as-logged annulus; and
$FF_{out,liq}$ is a total fluid frictional force between a fluid contained within the annulus and the outer surface of the cut casing in the liquid-filled annulus for the total length of the cut casing.

12. The method of claim 9, wherein determining the preferred cutting depth comprises: calculating a threshold force ($F_{thresh}$) based on the specifications of casing retrieval equipment, wherein the preferred cutting depth provides for $F_{drag} < F_{thresh}$.

13. The method of claim 9, wherein determining the preferred cutting depth comprises: calculating a tension ($T_{drag}$) using $F_{drag}$ and a threshold tension ($T_{thresh}$) based on the specifications of casing retrieval equipment, wherein the preferred cutting depth provides for $T_{drag} < T_{thresh}$.

14. The method of claim 9, wherein determining the preferred cutting depth comprises: calculating an overpull ($OP_{drag}$) using $F_{drag}$ and a threshold overpull ($OP_{thresh}$) thresh) based on the specifications of casing retrieval equipment, and wherein the preferred cutting depth provides for $OP_{drag} < OP_{thresh}$.

15. A system comprising:
a conveyance extendable into a wellbore lined at least partially with a casing, wherein the conveyance is coupled to at least one of: a cement bond log tool, an ultrasonic device, or a neutron sensor, and wherein fluids and solids are contained in an annulus defined between the casing and the wellbore; and
a control system that includes a non-transitory medium readable by a processor and storing instructions that when executed by the processor cause the control system to:
measure at least one characteristic of the fluids and solids the at least one of: the cement bond log tool, the ultrasonic device, or the neutron sensor, and thereby providing an as-logged annulus;
model a liquid-filled annulus based on the as-logged annulus without solids therein;
model a plurality of cut casings at different cutting depths;
calculate a total force for the as-logged annulus ($F_{tot,as\ log}$) for extracting each of the plurality of cut casings;
calculate a total force for the liquid-filled annulus ($F_{tot,liq}$) for extracting each of the plurality of cut casings; and
determine a preferred cutting depth based on the $F_{tot,as\ log}$ for each of the plurality of cut casings, the $F_{tot,liq}$ for each of the plurality of cut casings, and specifications of casing retrieval equipment.

16. The system of claim 15, wherein $F_{tot,as\ log}$ is calculated according to Equation 1:

$$F_{tot,as\ log} = EW_{cs} + FF_{in,as\ log} + FF_{out,as\ log} + FS_{out,aslog} + F_{shear} \qquad \text{Equation 1}$$

where:
$EW_{cs}$ is a total effective casing weight of the cut casing;
$FF_{in,as\ log}$ is a total fluid frictional force between a fluid contained within the cut casing and an inner surface of the cut casing in the as-logged annulus for a total length of the cut casing;
$FF_{out,as\ log}$ is a total fluid frictional force between a fluid contained within the annulus and an outer surface of the cut casing in the as-logged annulus for the total length of the cut casing;
$FS_{out,as\ log}$ is a total solid frictional force between solids contained within the annulus and the outer surface of the cut casing in the as-logged annulus for the total length of the cut casing;
$F_{shear}$ is a total shear force to break the bond between a cement sheath in the annulus and the cut casing in the as-logged annulus;
$FF_{in,liq}$ is a total fluid frictional force between a fluid contained within the cut casing and the inner surface of the cut casing in the liquid-filled annulus for the total length of the cut casing; and
$FF_{out,liq}$ is a total fluid frictional force between a fluid contained within the annulus and the outer surface of the cut casing in the liquid-filled annulus for the total length of the cut casing.

17. The system of claim 15, $F_{tot,liq}$ is calculated according to Equation 2:

$$F_{tot,liq} = EW_{cs} + FF_{in,liq} + FF_{out,liq} \qquad \text{Equation 2}$$

where:
- $EW_{cs}$ is a total effective casing weight of the cut casing;
- $FF_{in,as\ log}$ is a total fluid frictional force between a fluid contained within the cut casing and an inner surface of the cut casing in the as-logged annulus for a total length of the cut casing;
- $FF_{out,as\ log}$ is a total fluid frictional force between a fluid contained within the annulus and an outer surface of the cut casing in the as-logged annulus for the total length of the cut casing;
- $FS_{out,as\ log}$ is a total solid frictional force between solids contained within the annulus and the outer surface of the cut casing in the as-logged annulus for the total length of the cut casing;
- $F_{shear}$ is a total shear force to break the bond between a cement sheath in the annulus and the cut casing in the as-logged annulus;
- $FF_{in,liq}$ is a total fluid frictional force between a fluid contained within the cut casing and the inner surface of the cut casing in the liquid-filled annulus for the total length of the cut casing; and
- $FF_{out,liq}$ is a total fluid frictional force between a fluid contained within the annulus and the outer surface of the cut casing in the liquid-filled annulus for the total length of the cut casing.

18. A system comprising:
- a conveyance extendable into a wellbore lined at least partially with a casing, wherein the conveyance is coupled to at least one of: a cement bond log tool, an ultrasonic device, or a neutron sensor, and wherein fluids and solids are contained in an annulus defined between the casing and the wellbore; and
- a control system that includes a non-transitory medium readable by a processor and storing instructions that when executed by the processor cause the control system to:
  - measure at least one characteristic of fluids and solids disposed in an annulus formed by a casing and a wellbore with at least one of: a cement bond log, an ultrasonic device, or a neutron sensor, thereby providing an as-logged annulus;
  - model a liquid-filled annulus based on the as-logged annulus without solids therein;
  - model a plurality of cut casings at different cutting depths;
  - calculate a drag force ($F_{drag}$) for extracting each of the plurality of cut casings based on the as-logged annulus and the liquid-filled annulus; and
  - determine a preferred cutting depth based on the $F_{drag}$ for each of the plurality of cut casings and specifications of casing retrieval equipment.

19. The system of claim 18, wherein $F_{drag}$ is calculated according to Equation 4:

$$F_{drag} = FF_{out,as\ log} + FS_{out,as\ log} + F_{shear} - FF_{out,liq} \qquad \text{Equation 4}$$

where:
- $FF_{out,as\ log}$ is a total fluid frictional force between a fluid contained within the annulus and an outer surface of the cut casing in the as-logged annulus for the total length of the cut casing;
- $FS_{out,as\ log}$ is a total solid frictional force between solids contained within the annulus and an inner surface of the cut casing in the as-logged annulus for the total length of the cut casing;
- $F_{shear}$ is a total shear force to break the bond between a cement sheath in the annulus and the cut casing in the as-logged annulus; and
- $FF_{out,liq}$ is a total fluid frictional force between a fluid contained within the annulus and the outer surface of the cut casing in the liquid-filled annulus for the total length of the cut casing.

* * * * *